United States Patent
Ito et al.

(10) Patent No.: US 10,204,654 B2
(45) Date of Patent: Feb. 12, 2019

(54) STORAGE DEVICE, INFORMATION PROCESSING SYSTEM, AUTHENTICATION METHOD, AND NON-TRANSITORY COMPUTER READABLE MEDIUM

(71) Applicant: BUFFALO INC., Nagoya-shi (JP)

(72) Inventors: Tsukasa Ito, Nagoya (JP); Suguru Ishii, Nagoya (JP)

(73) Assignee: BUFFALO INC., Nagoya-shi (JP)

( * ) Notice: Subject to any disclaimer, the term of this patent is extended or adjusted under 35 U.S.C. 154(b) by 399 days.

(21) Appl. No.: 14/861,579

(22) Filed: Sep. 22, 2015

(65) Prior Publication Data

US 2016/0234185 A1 Aug. 11, 2016

(30) Foreign Application Priority Data

Feb. 5, 2015 (JP) .................................. 2015-21641
Apr. 28, 2015 (JP) .................................. 2015-91892

(51) Int. Cl.

| | |
|---|---|
| G06F 7/04 | (2006.01) |
| G06F 15/16 | (2006.01) |
| G06F 17/30 | (2006.01) |
| H04L 29/06 | (2006.01) |
| G11B 20/12 | (2006.01) |

(52) U.S. Cl.
CPC ...... *G11B 20/1217* (2013.01); *G11B 20/1258* (2013.01); *H04L 63/0853* (2013.01); *G11B 2020/1242* (2013.01)

(58) Field of Classification Search
USPC ............................................................ 726/4
See application file for complete search history.

(56) References Cited

U.S. PATENT DOCUMENTS

| | | | |
|---|---|---|---|
| 2003/0024976 A1* | 2/2003 | Komurasaki | B60R 25/04 235/375 |
| 2009/0178127 A1* | 7/2009 | Ogino | G06F 21/34 726/7 |
| 2010/0175128 A1* | 7/2010 | Onozu | G06F 21/31 726/20 |
| 2012/0137063 A1* | 5/2012 | Horibe | G06F 12/0866 711/113 |

(Continued)

FOREIGN PATENT DOCUMENTS

| | | |
|---|---|---|
| JP | 2006-113719 | 4/2006 |
| JP | 2007-249263 | 9/2007 |

(Continued)

OTHER PUBLICATIONS

Office Action dated Jun. 28, 2016 in Japanese Patent Application No. 2015-091892 (with English summary).

(Continued)

*Primary Examiner* — Brandon S Hoffman
*Assistant Examiner* — Samuel Ambaye
(74) *Attorney, Agent, or Firm* — Oblon, McClelland, Maier & Neustadt, L.L.P.

(57) ABSTRACT

According to one aspect of the disclosure, there is provided a storage device that includes: a storage medium; and circuitry that reads identification information stored on an integrated circuit card (IC card), and performs authentication using the identification information read by the circuitry and basic identification information stored in a specific area of the storage medium.

17 Claims, 12 Drawing Sheets

(56) References Cited

U.S. PATENT DOCUMENTS

2013/0132739 A1   5/2013   Matsushiba et al.

FOREIGN PATENT DOCUMENTS

| JP | 2008-282064 A | 11/2008 |
| JP | 2009-42927 A | 2/2009 |
| JP | 2009-54081 A | 3/2009 |
| JP | 2009-288911 | 12/2009 |
| JP | 2009-289242 A | 12/2009 |
| JP | 2010-191531 | 9/2010 |
| JP | 2010-237768 | 10/2010 |
| JP | 2013-149022 A | 8/2013 |
| WO | WO 2013/073260 A1 | 5/2013 |

OTHER PUBLICATIONS

Office Action dated Sep. 5, 2017 in Japanese Patent Application No. 2018-195462 (with an English summary of the Office Action).

* cited by examiner

STORAGE DEVICE, INFORMATION PROCESSING SYSTEM, AUTHENTICATION METHOD, AND NON-TRANSITORY COMPUTER READABLE MEDIUM

CROSS REFERENCE TO RELATED APPLICATION

The present disclosure contains subject matter related to that disclosed in Japanese Patent Application Nos. 2015-21641 and 2015-91892 filed in the Japan Patent Office on Feb. 5, 2015 and Apr. 28, 2015, respectively, the entire contents of which are hereby incorporated by reference.

TECHNICAL FIELD

The present disclosure relates to a storage device having a removable storage medium, an information processing system, an authentication method for a storage device, and a non-transitory storage medium.

RELATED ARTS

A conventional technique authenticates access to a flash memory device using identification information, stored on an integrated circuit (IC) card typified by the contactless IC card, for identifying the IC card individually (e.g., see JP-2010-237768-A).

The identification information on the IC card in this specification means information given uniquely to individual IC cards typically at the time of manufacture. Usually, the IC cards are sold with their identification information written to a chip on each IC card. The identification information is named differently depending on the IC card standards. For example, the identification information is called IDm for FeliCa (registered trademark) cards, or called UID for Mifare (registered trademark) cards. The identification information can be read from IC cards using suitable firmware or a software development kit (SDK), for example, offered by IC card standard providers. In some cases, the firmware or other programs may be stored beforehand in the IC chips of controllers for reading IC card.

The term "IC card" in this specification also embraces smartphones that incorporate an IC chip having IC card functionality (e.g., FeliCa chip in the case of FeliCa). The standards for contactless IC cards cover near field communication (NFC).

However, the above-described storage devices known in the art only use semiconductor memories, such as flash memories, as their storage media. The conventional storage devices do not include those that use hard disk drives (HDD) as their storage media.

The present disclosure has been made in view of the above circumstances and provides a storage device, an information processing system, an authentication method for a storage device, and a non-transitory storage medium whereby an IC card is used for authentication of access to the storage device such as the HDD having a storage medium.

SUMMARY

According to one aspect of the disclosure, there is provided a storage device that includes: a storage medium; and circuitry that reads identification information stored on an integrated circuit card (IC card), and performs authentication using the identification information read by the circuitry and basic identification information stored in a specific area of the storage medium.

DESCRIPTION OF THE DISCLOSURE

Preferred embodiments of the present disclosure will now be described below with reference to the accompanying drawings.

Figure 1:
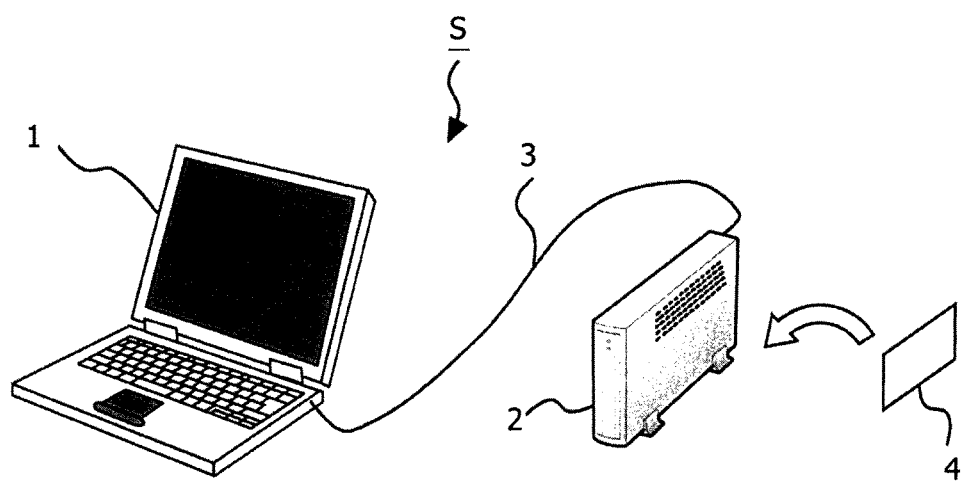
FIG. 1 is a schematic view showing an overall configuration of an information processing system according to one aspect of the present disclosure.

FIG. 1 is a schematic view showing an overall configuration of an information processing system S according to one aspect of the present disclosure. In FIG. 1, the information processing system S according to the aspect of the present disclosure includes an information processing device 1 and a storage device 2.

The information processing device 1 is a personal computer (PC) or a smartphone, for example. The information processing device 1 is connected in communication with the storage device 2 via a data communication cable such as a universal serial bus (USB) cable 3. The storage device 2 is, for example, a USB hard disk drive (HDD) that incorporates a detachable storage medium such as a HDD (not shown in FIG. 1). The storage device 2 has a reading section (not shown in FIG. 1) that reads identification information stored on an IC card 4 such as a contactless IC card. Specific structures of the information processing device 1 and storage device 2 will be discussed later.

Figure 2:
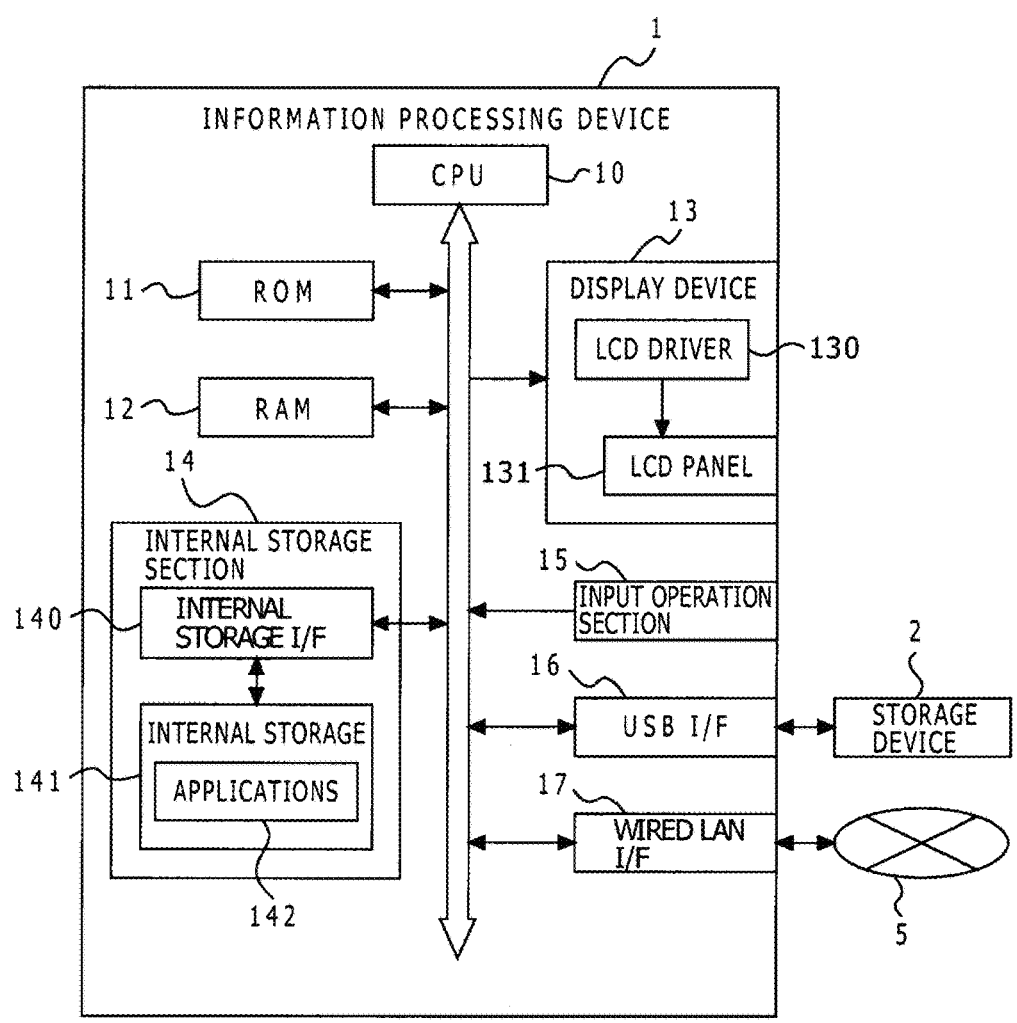
FIG. 2 is a block diagram showing an overall structure of an information processing device making up part of the information processing system according to one aspect of the present disclosure.

FIG. 2 is a block diagram showing an overall structure of the information processing device 1 making up part of the information processing system S according to one aspect of the present disclosure. In FIG. 2, the information processing device 1 has a central processing unit (CPU) 10, a read-only memory (ROM) 11, a random access memory (RAM) 12, a display device 13, an internal storage section 14, an input operation section 15, a USB interface (I/F) 16, and a wired local area network (LAN) I/F 17. The CPU 10, ROM 11, RAM 12, display device 13, internal storage section 14, input operation section 15, USB I/F 16, and wired LAN I/F 17 are interconnected via a common bus.

The CPU 10 controls operation of the entire information processing device 1 by executing programs, such as firmware stored in the ROM 11, which have been expanded in the RAM 12. The CPU 10 also has functions of the sections shown in FIG. 4 by executing programs held in the ROM 11. The operation of those sections in FIG. 4 will be discussed later. The ROM 11 stores the above-mentioned programs such as firmware and diverse setting data. The RAM 12 operates as a work memory for the information processing device 1, temporarily accommodating the programs and data.

The display device 13 has a liquid crystal display (LCD) panel 131 and an LCD driver 130 that drives the LCD panel 131. The LCD panel 131 has its display surface exposed on the surface of the information processing device 1. When the CPU 10 supplies the LCD driver 130 with the data constituting the display screen, the LCD driver 130 in turn drives the LCD panel 131 to display a desired screen on the display surface of the LCD panel 131.

The internal storage section 14 has an internal storage 141 and an internal storage I/F 140. The internal storage 141 is, for example, a semiconductor memory such as a flash memory, a HDD, or some other storage medium that stores various data and programs including application programs 142 used by the information processing device 1. Given a command to write or read data to or from the internal storage 141, the internal storage interface 140 exercises control to write or read the data while controlling the entire internal storage 141 and then outputs the read data. The internal storage 141 may be a detachable nonvolatile memory card such as a micro secure digital (SD) card. In this case, the internal storage interface 140 will also have a memory card slot to which the memory card is attached.

The input operation section 15 outputs an operation input signal in response to the operation input by the user operating this input operation section 15. The input operation section 15 is, for example, a keyboard, a mouse, and/or buttons with which the user may input various operations including those for giving operating commands. The USB interface 16 permits transmission and reception of data to and from a USB device such as the storage device 2 via a USB connector (not shown) in accordance with the USB 2.0 or the USB 3.0 standard, for example. The wired LAN I/F 17 permits wired communication with the Internet 5 in accordance with the Institute of Electrical and Electronics Engineers (IEEE) 802.3 standard, for example.

Figure 3:
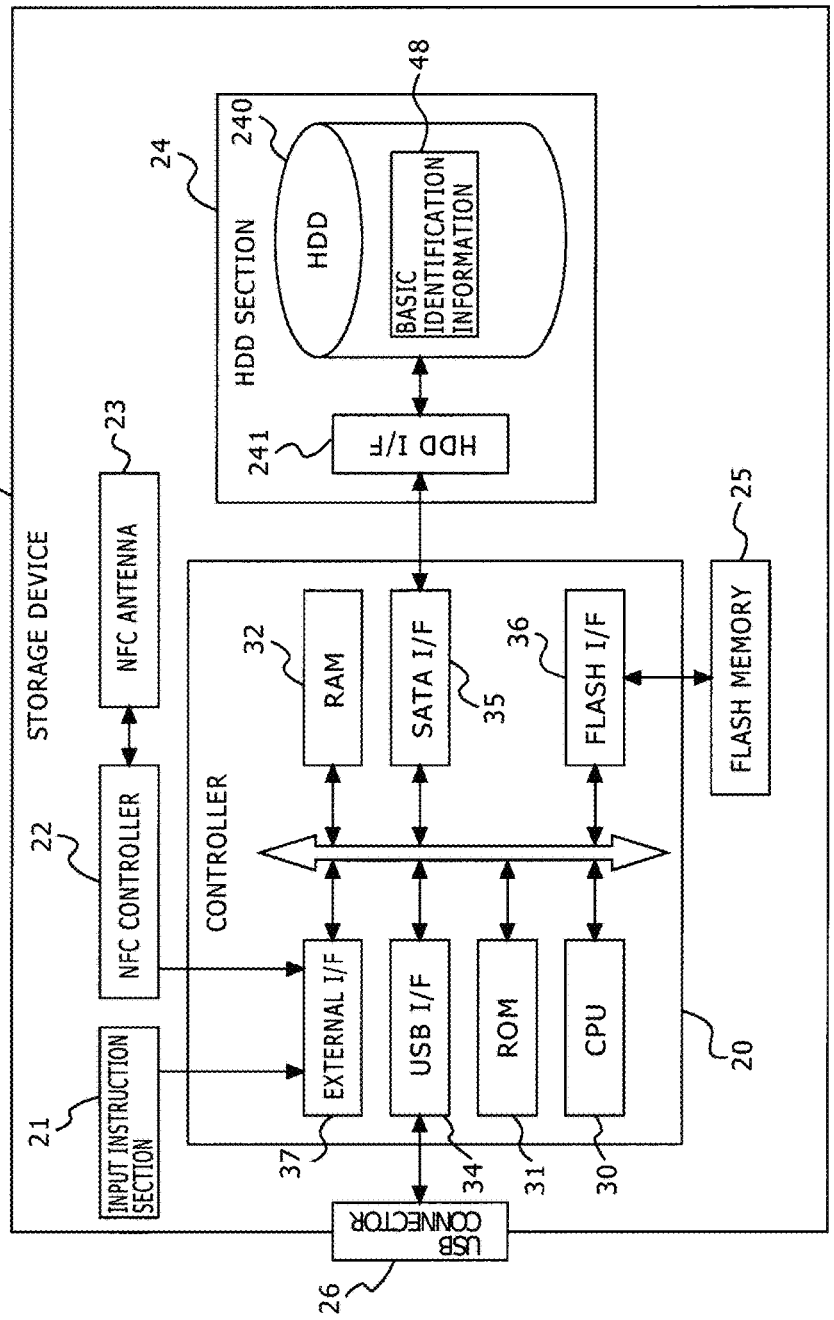
FIG. 3 is a block diagram of a storage device making up part of the information processing system according to one aspect of the present disclosure.

FIG. 3 is a block diagram of the storage device 2 making up part of the information processing system S according to one aspect of the present disclosure. In FIG. 3, the storage device 2 in one aspect of the present disclosure has a controller 20, an input instruction section 21, an NFC controller 22, an NFC antenna 23, a HDD section 24, a flash memory 25, and a USB connector 26.

The controller 20 exercises control to write and read data to and from the HDD section 24 of the storage device 2, to perform diverse operations based on the USB standard between the storage device 2 and a USB device connected via the USB connector 26, and to transmit and receive data to and from peripheral devices such as the input instruction section 21. The controller 20 includes a CPU 30, a ROM 31, a RAM 32, a USB I/F 34, a serial advanced technology attachment (SATA) I/F 35, a flash I/F 36, and an external I/F 37. These components are interconnected via a bus.

The CPU 30 controls the entire storage device 2 by executing programs, such as firmware stored in the ROM 31, which have been expanded in the RAM 32. The CPU 30 also works as functional sections such as those shown in FIG. 4 by executing programs held in the ROM 31. The operations of the functional sections in FIG. 4 will be discussed later. The ROM 31 stores the above-mentioned programs such as firmware. The RAM 32 operates as a work memory for the storage device 2, temporarily accommodating the programs and data.

The USB I/F 34 permits transmission and reception of data to and from a USB host such as the information processing device 1 connected thereto via the USB connector 26 in accordance with the USB 2.0 or the USB 3.0 standard, for example. The SATA I/F 35 enables transmission and reception of data to and from the HDD section 24 that is a SATA device connected thereto via a SATA connector (not shown) in accordance with the SATA standard. The flash I/F 36 is, for example, a serial peripheral interface (SPI) that allows transmission and reception of data to and from the flash memory 25. The external I/F 37 is, for example, a general purpose input/output (GPIO) interface that permits transmission and reception of data to and from peripheral devices such as the input instruction section 21.

The input instruction section 21 outputs an operation input signal to the external I/F 37 of the controller 20 in response to the operation input by the user operating this input instruction section 21. The input instruction section 21 is, for example, buttons that permit the input of operating commands.

The NFC controller 22 transmits and receives data through contactless communication to and from the IC card 4 brought near the NFC antenna 23. The NFC controller only needs to read at least identification information stored in the IC card 4. It is only required for the NFC controller 22 to send and receive data so as to be able to read the identification information. The NFC controller 22 receives various commands via the external I/F 37 of the controller 20, and outputs the data received via the NFC antenna 23 to the controller 20 via the external I/F 37.

The NFC antenna 23, installed near the surface of the housing inside the storage device 2, radiates electromagnetic waves toward the IC card 4 near the antenna 23, and receives electromagnetic waves from the IC card 4. The NFC controller 22 controls the electromagnetic radiation emanating from the NFC antenna 23. The electromagnetic waves received by the NFC antenna 23 are converted to an electrical signal before being sent to the NFC controller 23.

The HDD section 24 has a HDD 240 and a HDD I/F 241. The HDD 24 has a disk serving as a recording medium, a rotating part for rotating the disk, and a head for writing and reading data to and from the disk (all not shown). The HDD 240 is detachably mounted in the HDD section 24. The specific way of mounting and dismounting the HDD 240 to and from the HDD section 24 may be selected as desired from among known schemes. An example of such schemes is the HDD 240 and the HDD I/F 241 are connected via connectors. The HDD 240 stores programs and data including basic identification information 48. The basic identification information 48 will be discussed later in detail.

The HDD I/F 241 complies with the SATA standard. Given a command to write or read data to or from the HDD 240, the HDD I/F 241 exercises control to write or read the data while controlling the entire HDD 240 and to output the retrieved data.

The flash memory 25 stores the diverse programs and data for use by the controller 20 and HDD section 24. The flash memory 25 is also used as a cache memory at the time of exchanging data between the HDD section 24 and the controller 20.

The USB connector 26 is a female USB connector (USB receptacle) structured to accommodate a male USB connector (USB plug) of the USB cable 3.

Figure 4:
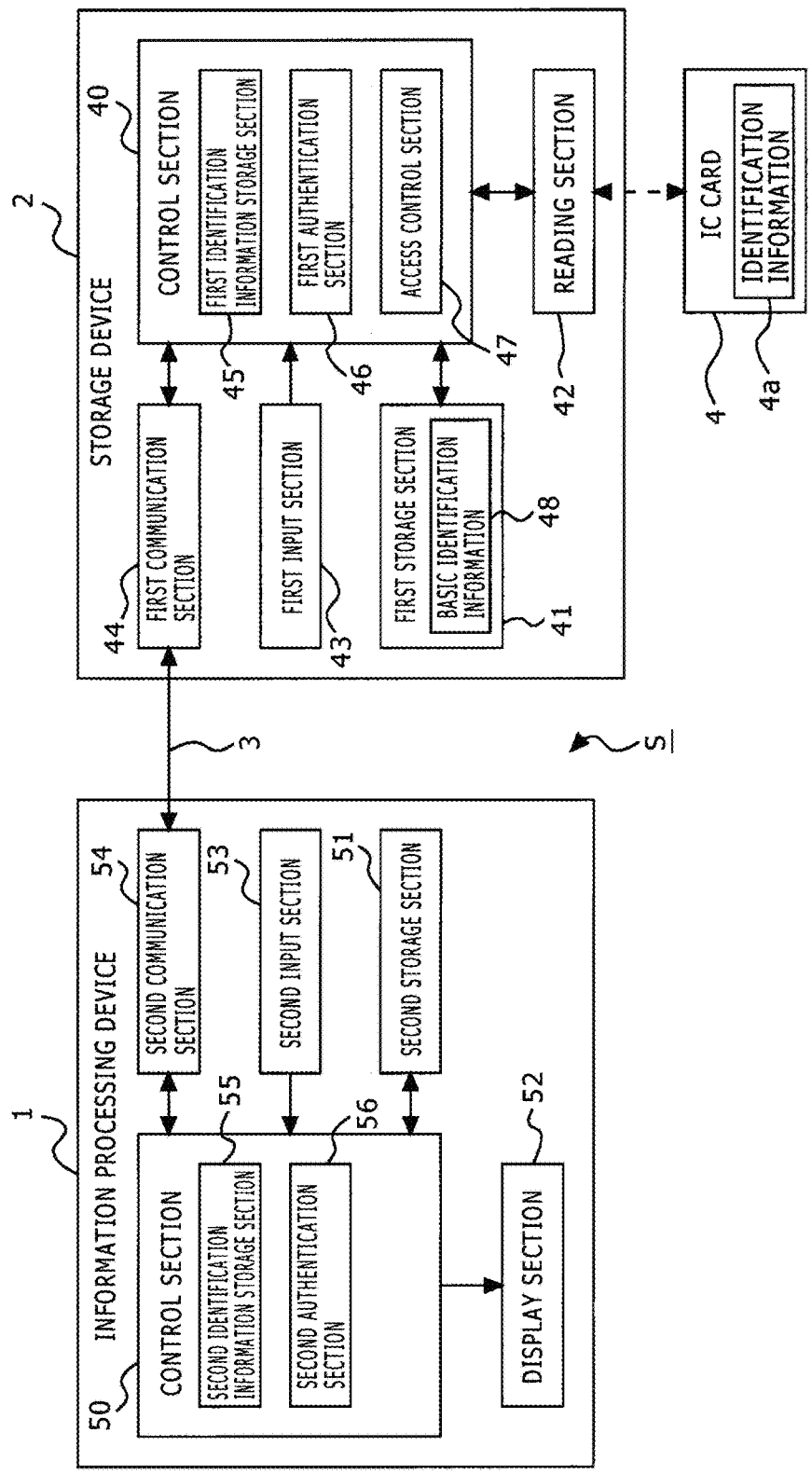
FIG. 4 is a block diagram showing a functional structure of the information processing system according to one aspect of the present disclosure.

FIG. 4 is a block diagram showing a functional structure of the information processing system S according to one aspect of the present disclosure. In FIG. 4, the storage device 2 constituting part of the information processing system S in one aspect of the present disclosure has a control section 40, a first storage section 41, a reading section 42, a first input section 43, and a first communication section 44. The control section 40 has a first identification information storage section 45, a first authentication section 46, and an access control section 47.

The first identification information storage section 45 stores identification information 4a read by the reading section 42 into a specific area of the first storage section 41 as the basic identification information 48. Preferably, when detecting that the basic identification information 48 is not stored in the specific area of the first storage section 41, the first identification information storage section 45 causes the reading section 42 to start reading the identification information 4a in the IC card 4. The first identification information storage section 45 then stores the identification information 4a read by the reading section 42 into the specific area of the first storage section 41 as the basic identification information 48.

The first authentication section 46 performs authentication using the identification information 4a read by the reading section 42 and the basic identification information 48. Preferably, when detecting that the basic identification information is stored in the specific area of the first storage section 41 after the storage device 2 starts operating, the first authentication section 46 causes the reading section 42 to read the identification information 4a in the IC card 4 and performs authentication using the identification information 4a read by the reading section 42 and the basic identification information 48.

In the above arrangement, the specific area is preferably an area not recognized by the information processing device 1 connected to the storage device 2. One such specific area is known to be provided as a hidden area in the first storage section 41 of the storage device 2. If the control section 40 controls the first storage section 41 through logical block addressing (LBA), one way of providing the hidden area in the first storage section 41 is by establishing the area having the lowest LBA (usually LBA 0) as the hidden area. In this case, the control section 40 may notify the information processing device 1 of the highest LBA minus 1 so that the control section 40 will access that area in the first storage section 41 which has the LBA lower by 1 than the LBA designated by the information processing device 1 as the area to or from which to write or read data in the storage device 2. Alternatively, the area having the highest LBA may be established as the hidden area.

In addition to the basic identification information 48 alone, the hidden area may store, for example, the firmware of the storage device 2.

Preferably, the first identification information storage section 45 may be arranged to append additional information to the identification information 4a read by the reading section 42 to generate the basic identification information 48 having a fixed data length, and to store the generated basic identification information into the specific area of the first storage section 41. This arrangement is preferable for the following reasons.

The identification information 4a in the IC card 4 may vary in data length depending on the IC card standard. For example, the identification information IDm according to the FeliCa standard is 8 bytes, whereas the identification information UID according to the Mifare standard is 4, 7, or 10 bytes. Furthermore, in order to increase the security of the identification information in the IC card 4, the data length of the identification information 4a may possibly be longer in the future. This requires, preferably, appending additional information to the identification information 4a read by the reading section 42 so that the identification information 4a is given a maximum data length predictable at this moment (e.g., 15 bytes), thus generating the basic identification information 48 having a fixed data length. This in turn makes it easier to deal with future changes in the card standard, stabilizing the operation of the storage device 2 even further.

More specifically, the first identification information storage section 45 may preferably add "0" data as additional information to the identification information 4a read by the reading section 42 to generate the basic identification information 48 having a fixed data length. The additional information may be added preferably in the form of as many data items as needed for the retrieved identification information 4a to complete the fixed data length as high- or low-order digits, for example.

Also, the first identification information storage section 45 may preferably append type information indicative of the type of the IC card 4 to the identification information 4a read by the reading section 42 to generate the basic identification information 48, and store the generated basic identification information 48 into the specific area of the first storage section 41.

As described above, there are different standards for the IC card 4, with the specifications of the identification information probably varying from one standard to another. This means that if the type information indicative of the type of the IC card 4 is added to the identification information 4a to generate the basic identification information 48, the first authentication section 46 will further improve authentication accuracy when performing authentication using the identification information 4a in the IC card 4 and the basic identification information 48. In particular, when the first authentication section 46 identifies the additional information part of the basic identification information 48 having the fixed data length generated by the first identification information storage section 45, the first authentication section 46 may achieve the identification on the basis of the type information included in the basic identification information 48, thereby improving authentication accuracy even further.

More specifically, if the first identification information storage section 45 generates 15-byte data by adding to the identification information 4a 1-byte data as the type information varying from one IC card 4 to another, the basic identification information 48 that is 16 bytes long as a whole needs only to be generated.

Furthermore, the first identification information storage section 45 may preferably cause the reading section 42 to read the identification information 4a multiple times and, when the identification information 4a read by the reading operations is the same a predetermined number of times, store the same identification information 4a into the specific area of the first storage section 41 as the basic identification information 48. This arrangement is preferable for the following reasons.

According to some standards of the IC card 4, the information read by the reading section 42 as the identification information 4a is set to be a random value (as per some rules of the Mifare standard). In such a case, if the first identification information storage section 45 generates the basic identification information 48 based on the random-value identification information 4a, an attempt to perform authentication with the same IC card 4 is highly unlikely to be successful. The first identification information storage section 45 thus causes the reading section 42 to read the identification information 4a a number of times to eliminate an IC card 4 that has a random value as its identification information 4a. When the identification information 4a read by the multiple reading operations turns out to be the same a predetermined number of times, the first identification information storage section 45 determines that the same identification information 4a is suitable for authentication and stores this identification information 4a into the specific area of the first storage section 41. The number of times the identification information 4a is read may be determined as desired, as long as it can be determined whether the identification information 4a read by the reading section 42 is a random value. In one example, the identification information 4a is read twice.

The first identification information storage section 45 sends to the information processing device 1 the basic identification information 48 stored in the specific area of the first storage section 41. The basic identification information 48 may be sent to the information processing device 1 at any time; i.e., when the storage device 2 detects it has been connected to the information processing device 1 or when the information processing device 1 requests the information 48 be sent.

The access control section 47 sets whether to permit access to the first storage section 41. In this embodiment, when the information processing device 1 connected via the USB cable 3 makes an access request to the storage device 2, the access control section 47 sets whether to permit the information processing device 1 to access the first storage section 41 as requested.

A specific manner of how the access control section 47 sets whether to permit access may be determined as desired. In one example, where the information processing device 1 and the storage device 2 are interconnected via the USB cable 3, the access control section 47 does not recognize the information processing device 1 as a USB device defined by the USB standard. In another example, the access control section 47 recognizes the information processing device 1 as a USB device and allows the information processing device 1 to recognize the storage device 2 as what is called a mass storage, but notifies the information processing device 1 that there is no file in the storage device 2 (empty drive) upon request for access thereto. These examples are embraced within the scope of the access control section 47 setting whether to permit access.

Also embraced within the scope of the access control section 47 setting whether to permit access is the practice of providing a plurality of areas (drives) in the first storage section 41 so that the access control section 47 switches drives recognizable by the information processing device 1. The above-mentioned specific area or hidden area may be included in these drives. It should be noted that the hidden area is a drive not recognized by the information processing device 1.

When authentication by the first authentication section 46 is successful, the access control section 47 permits access to the first storage device 41. More specifically, after the authentication by the first authentication section 46 is successful in the above examples, the access control section 47 starts to recognize as a USB device and causing files and other data actually stored in the first storage section 41 to be displayed.

Alternatively, suppose that the first storage device 41 has a plurality of drives, and the information processing device 1 is only allowed to read data of one of the drives but is allowed to read and write the other drives. In such a case, if the access control section 47 selects the drive recognized by the information processing device 1 and switches the drive to the one that allows the information processing device 1 to only read its data, that is equivalent to the access control section 47 rejecting access to the first storage section 41. If the access control section 47 selects one of the drives recognized by the information processing device 1 and switches the drive to the one that allows the information processing device 1 to read and write its data, that is equivalent to the access control section 47 permitting access to the first storage section 41.

Preferably, if the basic identification information 48 is not stored in the specific area of the first storage section 41, the access control section 47 permits access to the first storage section 41. If the basic identification information 48 is stored in the specific area of the first storage section 41, the access control section 47 permits access to the first storage section 41 after the authentication by the first authentication section 46 is successful.

The first storage section 41 stores various programs and data including the basic identification information 48. In this embodiment, the first storage section 41 includes the above-mentioned HDD section 24, flash memory 25, ROM 31, and RAM 32. Preferably, the specific area in the first storage section 41 is provided on these storage media on which the areas not recognized by the information processing device 1 can be established. At least the HDD 240 in the HDD section 24 is preferable to be that one of those storage medium on which the areas not recognized by the information processing device 1 can be established. The HDD 240 can be controlled by the above-described LBA scheme. By suitably controlling the LBA value sent to the information processing device 1, the specific area is controlled not to be recognized by the information processing device 1. Alternatively, the specific area may also be provided in the flash memory 25 as needed.

The reading section 42 reads the identification information 4a stored in the IC card 4 under commands from the first identification information storage section 45 and the first authentication section 46.

The first input section 43 outputs an operation input signal on the basis of the operation input by the user. At this moment, it is preferable that at least either the first identification information storage section 45 or the first authentication section 46 command the reading section 42 to read the identification information only while the operation input signal is being output from the first input section 43. Because the reading section 42 consumes certain power while operating, the reading section 42 is preferably arranged to the information only while the user is explicitly inputting an access control change. This arrangement also prevents the access control section 47 from changing access control if the user inadvertently brings the IC card 4 near the storage device 2 to let the reading section 42 read the identification information 4*a* in the IC card 4.

The first communication section 44 communicates with a host device such as a second communication section 54 of the information processing device via the USB cable 3, thereby transmitting and receiving data to and from the information processing device 1, for example.

The information processing device 1 making up part of the information processing system S in one aspect of the present disclosure has a control section 50, a second storage section 51, a display section 52, a second input section 53, and a second communication section 54. The control section 50 has a second identification information storage section 55 and a second authentication section 56.

The second identification information storage section 55 stores the identification information 4*a* read by the reading section 42 of the storage device 2 into the specific area of the first storage section 41 as the basic identification information 48. Preferably, when detecting that the basic identification information 48 is not stored in the specific area of the first storage section 41 in the storage device 2, the second identification information storage section 55 causes the reading section 42 of the storage device 2 to start reading the identification information 4*a* in the IC card 4 and stores the identification information 4*a* read by the reading section 42 into the specific area of the first storage section as the basic identification information 48.

The second authentication section 56 performs authentication using the identification information 4*a* read by the reading section 42 of the storage device 2, and the basic identification information 48 that has been sent from the first identification information storage section 45 of the storage device 2 and stored in the specific area of the first storage section 41. Preferably, when detecting that the basic identification information 48 is stored in the specific area of the first storage section 41 in the storage device 2 at any suitable time after the storage device 2 starts operating, the second authentication section 46 causes the reading section 42 of the storage device 2 to start reading the identification information from the IC card 4, and performs authentication using the identification information 4*a* read by the reading section 42 and the basic identification information 48 stored in the specific area of the first storage section 41.

The second storage section 51 stores programs and data, for example. The display section 52 has a display surface (not shown) that displays a display screen based on a screen generation signal sent from the control section 50. The second input section 53 outputs an operation input signal on the basis of the operation input by the user. The second communication section 54 communicates with peripheral devices including the first communication section 44 of the storage device via the USB cable, thus transmitting and receiving data to and from the storage device 2, for example.

In the above-described structure, the control section 40 including the first identification information storage section 45, first authentication section 46, and access control section 47 as its components is formed primarily by the controller 20. The first storage section 41 is formed primarily by the HDD section 24, flash memory 25, ROM 31, and RAM 32. The reading section 42 is formed primarily by the NFC controller 22 and NFC antenna 23. The first input section 43 is formed primarily by the input instruction section 21. The first communication section 44 is formed primarily by the USB I/F 34.

The control section 50 including the second identification information storage section 55 and second authentication section 56 as its components is formed primarily by the CPU 10. The second storage section 51 is formed primarily by the ROM 11, RAM 12, and internal storage section 14. The display section 52 is formed primarily by the display device 13. The second input section 53 is formed primarily by the input operation section 15. The second communication section 54 is formed primarily by the USB I/F 16. The operations of the functional sections shown in FIG. 4 will be discussed later in detail.

Explained below with reference to the sequence diagrams of FIGS. 5 through 8 is the operation of the information processing system S in one aspect of the present disclosure.

Figure 5:
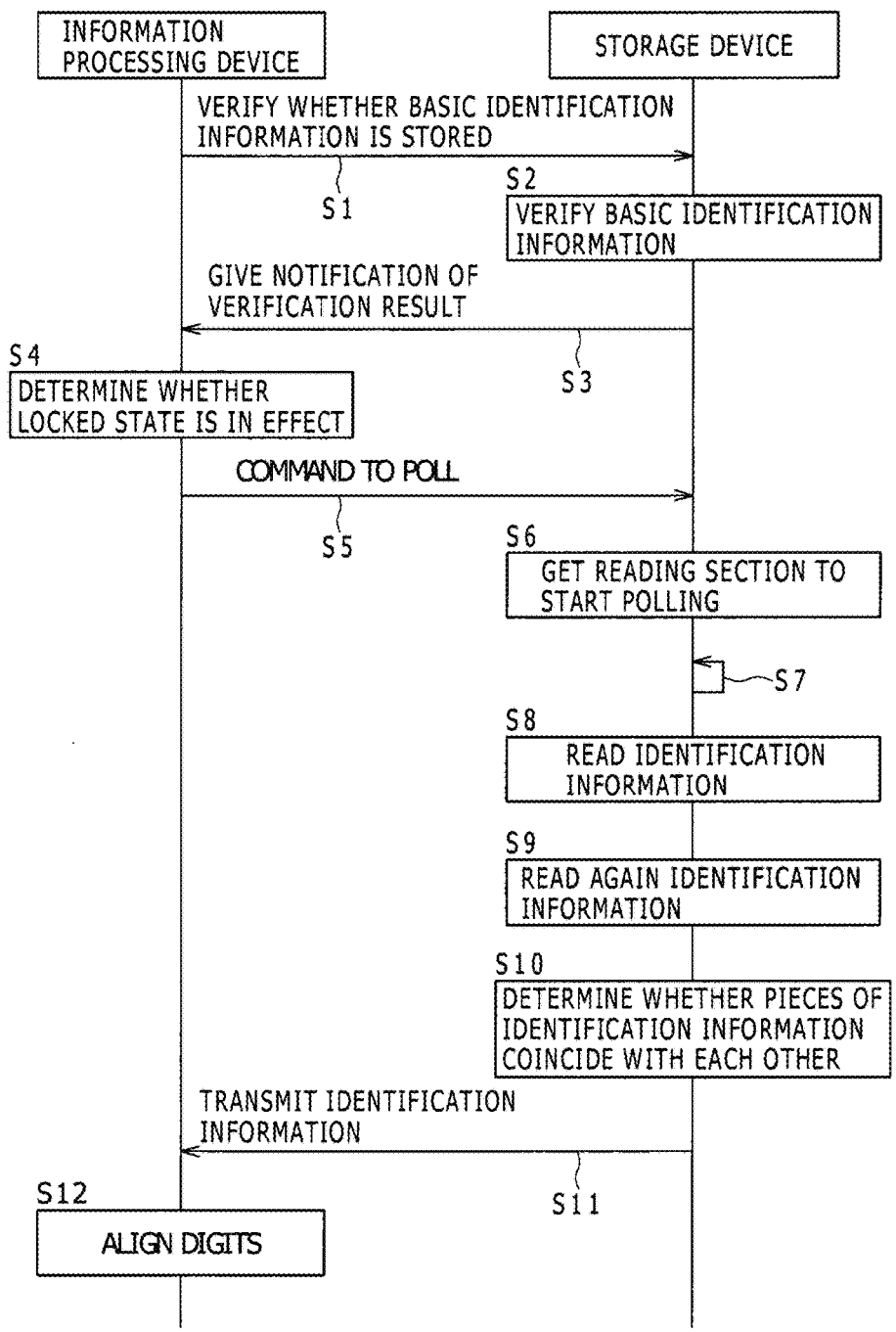
FIG. 5 is a sequence diagram showing typical operations by the information processing system according to one aspect of the present disclosure.
Figure 6:
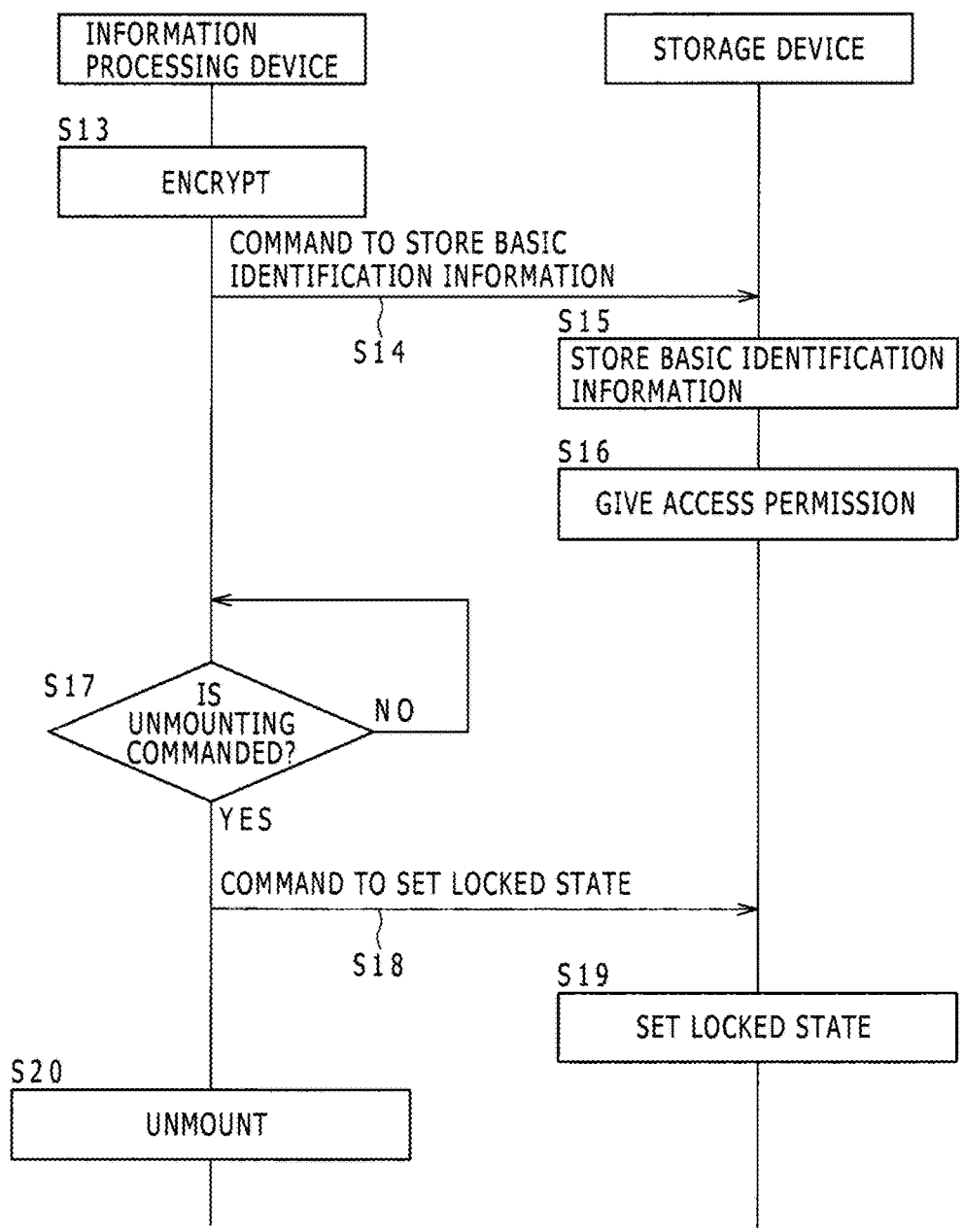
FIG. 6 is a sequence diagram showing other typical operations by the information processing system according to one aspect of the present disclosure.

FIGS. 5 and 6 are sequence diagrams for explaining the operations to store the basic identification information 48 into the first storage section 41 of the storage device 2. The sequence in FIG. 5 starts when, with the storage device 2 connected to the information processing device 1 via the USB cable 3 and with the storage device 2 recognized by the information processing device 1 as a mass storage, an application program 142 held in the internal storage section 14 that is the second storage section 51 of the information processing device 1 starts.

In step S1, the second identification information storage section 55 of the information processing device 1 gives the first identification information storage section 45 of the storage device 2 a command to verify whether the basic identification information 48 is stored in the specific area of the first storage section 41. In step S2, the first identification information storage section 45 of the storage device 2 accesses the specific area of the first storage section 41 to verify whether the basic identification information 48 is stored in that area. In the example shown in FIG. 5, the basic identification information 48 is not stored at this stage in the specific area of the first storage section 41 in the storage device 2.

In step S3, the first identification information storage section 45 notifies the second identification information storage section 55 of the information processing device 1 that the basic identification information 48 is not stored yet in the specific area of the first storage section 41. In step S4, when notified that the basic identification information 48 is not stored yet in the specific area of the first storage section 41, the second identification information storage section 55 of the information processing device 1 determines that the access control section 47 of the storage device 2 permits access to the first storage device 41, or an unlocked state.

In step S5, the second identification information storage section 55 gives the reading section 42 of the storage device 2 a command to start reading the identification information 4*a* in the IC card 4. Specifically, the second identification information storage section 55 commands the reading section 42 to start polling. In step S6, given the polling command from the second identification information storage section 55 in step S5, the first identification information storage section 45 causes the reading section 42 to start the polling.

In step S7, communication is about to take place between the reading section 42 polling and the IC card 4 being polled. When communication with the IC card 4 starts, the program moves to step S8. In step S8, the reading section 42 reads the identification information 4a in the IC card 4. The retrieved identification information 4a is stored temporarily into the first storage section 41.

In step S9, the first identification information storage section 45 causes the reading section 42 to read the identification information 4a in the IC card 4 again. The reread identification information 4a is also stored temporarily into the first storage section 41. In step S10, the first identification information storage section 45 compares multiple pieces of the identification information 4a thus stored in the first storage section 4 to determine whether they all coincide. In the example shown in FIG. 5, all pieces of the identification information 4a are assumed to coincide.

In step S11, the first identification information storage section 45 transmits to the second identification information storage section 55 of the information processing device 1 the identification information 4a all of which the multiple pieces have been found coinciding following the multiple reading operations (two operations in the example of FIG. 5) by the reading section 42. In step S12, the second identification information storage section 55 appends additional information to the identification information 4a which, read by the reading section 42, has different data length depending on the standard of the IC card 4. The additional information is appended to the identification information 4a so that it obtains a fixed data length through aligning its digits. The second identification information storage section 55 further prefixes the identification information 4a with type information indicative of the type of the IC card 4 to generate the basic identification information 48. In step S13, the second identification information storage section 55 encrypts the basic identification information 48 to ensure security. The encrypting process in step S13 is not requisite. Alternatively, the basic identification information 48 may be stored into the specific area of the first storage section 41 in the storage device 2 without being encrypted.

In step S14, the second identification information storage section 55 transmits to the first identification information storage section 45 of the storage device 2 a command to store the encrypted basic identification information 48 into the specific area of the first storage section 41. In step S15, given the command in step S14, the first identification information storage section 45 stores the basic identification information 48 into the specific area of the first storage section 41. In step S16, the access control section 47 permits access to the first storage section 41 again (the unlocked state).

In step S17, the control section 50 of the information processing device 1 waits for a command to unmount the storage device 2, the command being given typically by the user operating the second input section 53. Given the unmount command, the control section 50 in step S18 transmits to the access control section 47 of the storage device 2 a command to set a locked state in which access to the first storage section 41 is rejected. On the basis of the command in step S18, the access control section 47 in step S19 sets the state in which the first storage section 41 is not allowed to be accessed. In step S20, the control section 50 of the information processing device 1 unmounts the storage device 2.

Figure 7:
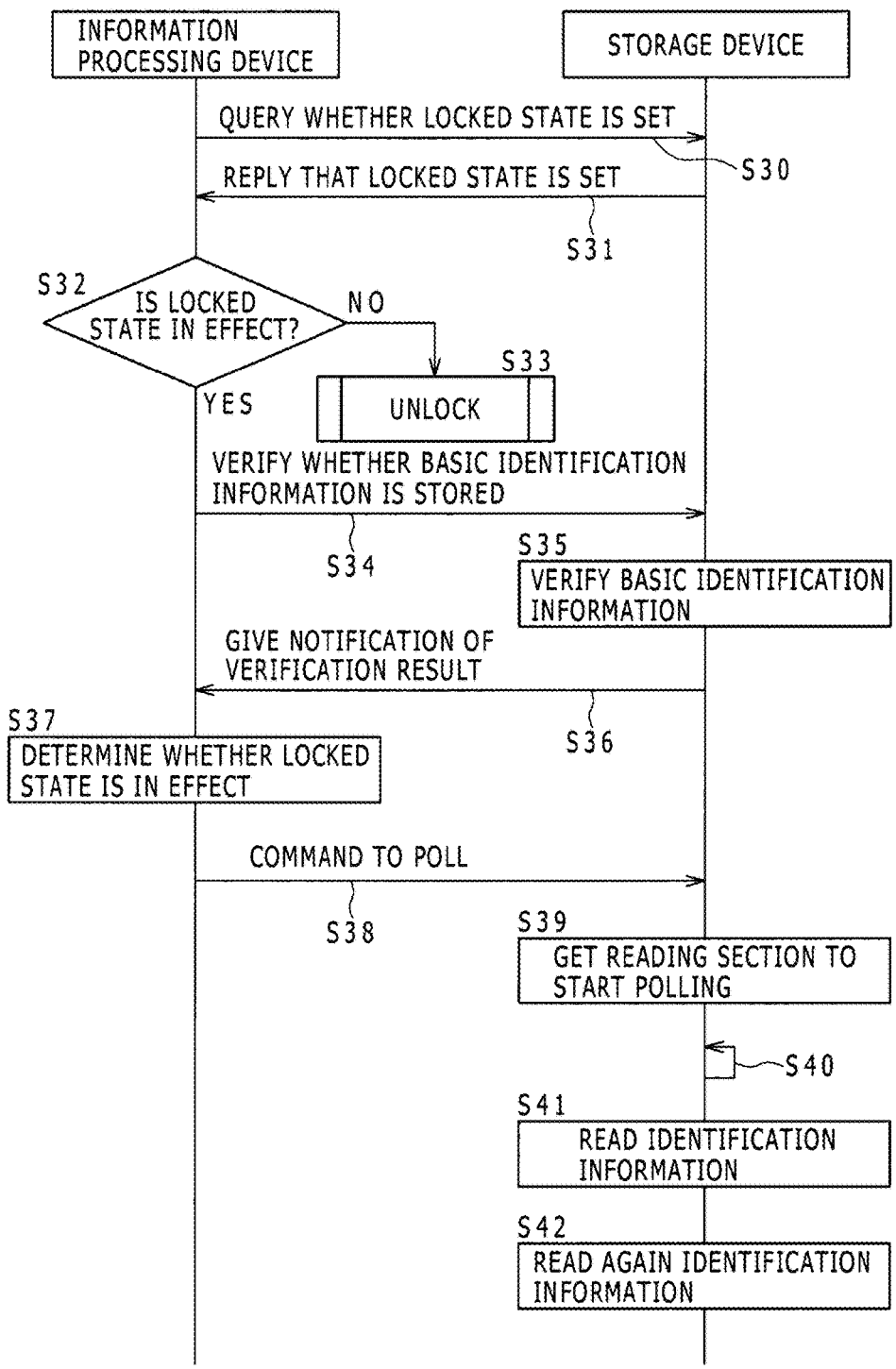
FIG. 7 is a sequence diagram showing still other typical operations by the information processing system according to one aspect of the present disclosure.
Figure 8:
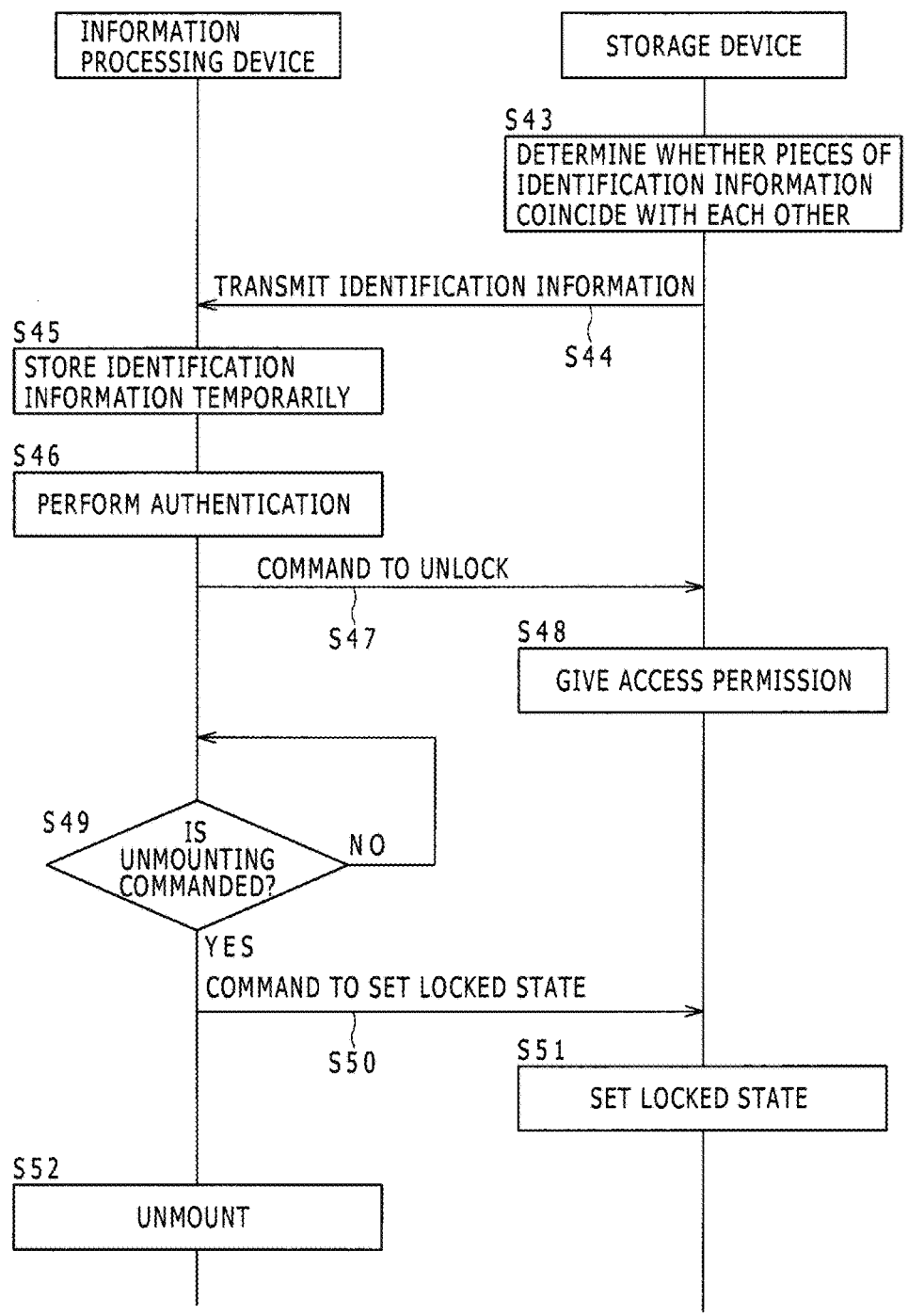
FIG. 8 is a sequence diagram showing still other typical operations by the information processing system according to one aspect of the present disclosure.

FIGS. 7 and 8 are sequence diagrams for explaining the operations performed when the information processing device 1 is connected to the storage device 2 in which the basic identification information 48 is stored in the specific area of the first storage section 41. The sequence in FIG. 7 starts when, with the storage device 2 connected to the information processing device 1 via the USB cable 3, an application program 142 held in the internal storage section 14 that is the second storage section 51 of the information processing device 1 starts.

In step S30, the second authentication section 56 of the information processing device 1 queries the access control section 47 of the storage device 2 to determine whether the first storage section 41 is set to be accessible. In the example shown in FIG. 7, the basic identification information 48 is stored in the specific area of the first storage section 41. Thus in step S31, the access control section 47 of the storage device 2 replies to the information processing device 1 that the first storage section 41 is in the locked state and not allowed to be accessed.

In step S32, on the basis of the reply in step S31 from the access control section 47 of the storage device 2, it is determined whether the storage device 2 is in the locked state. If the storage device 2 is determined to be in the locked state ("Yes" in step S32), the program moves to step S34. If the storage device 2 is determined to be in the unlocked state ("No" in step S32), the program moves to step S33. In step S33, the operations when the storage device 2 is in the unlocked state are carried out as shown in FIGS. 5 and 6.

The operations in steps S34 through S44 are substantially the same as those in steps S1 through S11 in FIGS. 5 and 6 except that they are performed by the first and the second authentication sections 46 and 56, and thus will not be discussed further. In step S36, however, the first authentication section 46 transmits to the second authentication section 56 of the information processing device 1 the basic identification information 48 along with the notification that the basic identification information 48 is stored in the specific area of the first storage section 41.

In step S45, the second authentication section 56 stores the identification information 4a sent from the first authentication section 46 into the second storage section 51 temporarily. In step S46, the second authentication section 56 performs authentication based on whether the identification information 4a coincides with the basic identification information 48. In the example shown in FIG. 8, it is assumed that the identification information 4a coincides with the basic identification information 48.

In step S47, the control section 50 of the information processing device 1 transmits to the access control section 47 of the storage device 2 a command to set the unlocked state in which the first storage section 41 is allowed to be accessed. In step S48, the access control section 47 actually sets the unlocked state in which first storage section 41 stays accessible.

Thereafter, the operations in steps S49 through S52 are substantially the same as the operations in steps S17 through S20 in FIGS. 5 and 6 except that they are performed by the first and the second authentication sections 46 and 56, and thus will not be discussed further.

As described above in detail, according to the information processing system S in one aspect of the present disclosure, the identification information 4a in the IC card 4 may be used to authenticate access to the storage device 2 that uses the HDD 240 as the storage medium.

In this manner, it is possible to implement the information processing system S capable of using the IC card 4 to authenticate the access to the storage device 2 such as the HDD section 24 equipped with the storage medium.

When the application program 142 stored in the second storage section 51 of the information processing device 1 is executed, the second identification information storage section 55 and the second authentication section 56 in the control section 50 of the information processing device 1 are implemented. Because authentication for access to the storage device 2 is also performed in this manner by the application program 142 of the information processing device 1, the information processing devices 1 or their operating systems (OS) to which the storage device 2 can be connected may be limited by placing constraints on the information processing devices 1 or on their OS on which the application program 142 can be executed. Also, the second input section 53 of the information processing device 1 may be used to request the input of a password, for example. Furthermore, in addition to the authentication, other operations may be carried out (e.g., virus scan software stored in the first storage section 41 of the storage device 2 may be started; if the virus scan software is not stored in the first storage section 41, then subsequent operations will not be performed).

In the foregoing examples, after the storage device 2 is connected to the information processing device 1, it is verified whether the basic identification information 48 is stored in the specific area of the first storage section 41 in the storage device 2. Alternatively, the verifying operation may be omitted. Instead, the basic identification information 48 may be generated by reading the identification information 4a in the IC card 4 at any time to set the locked state.

Figure 9:
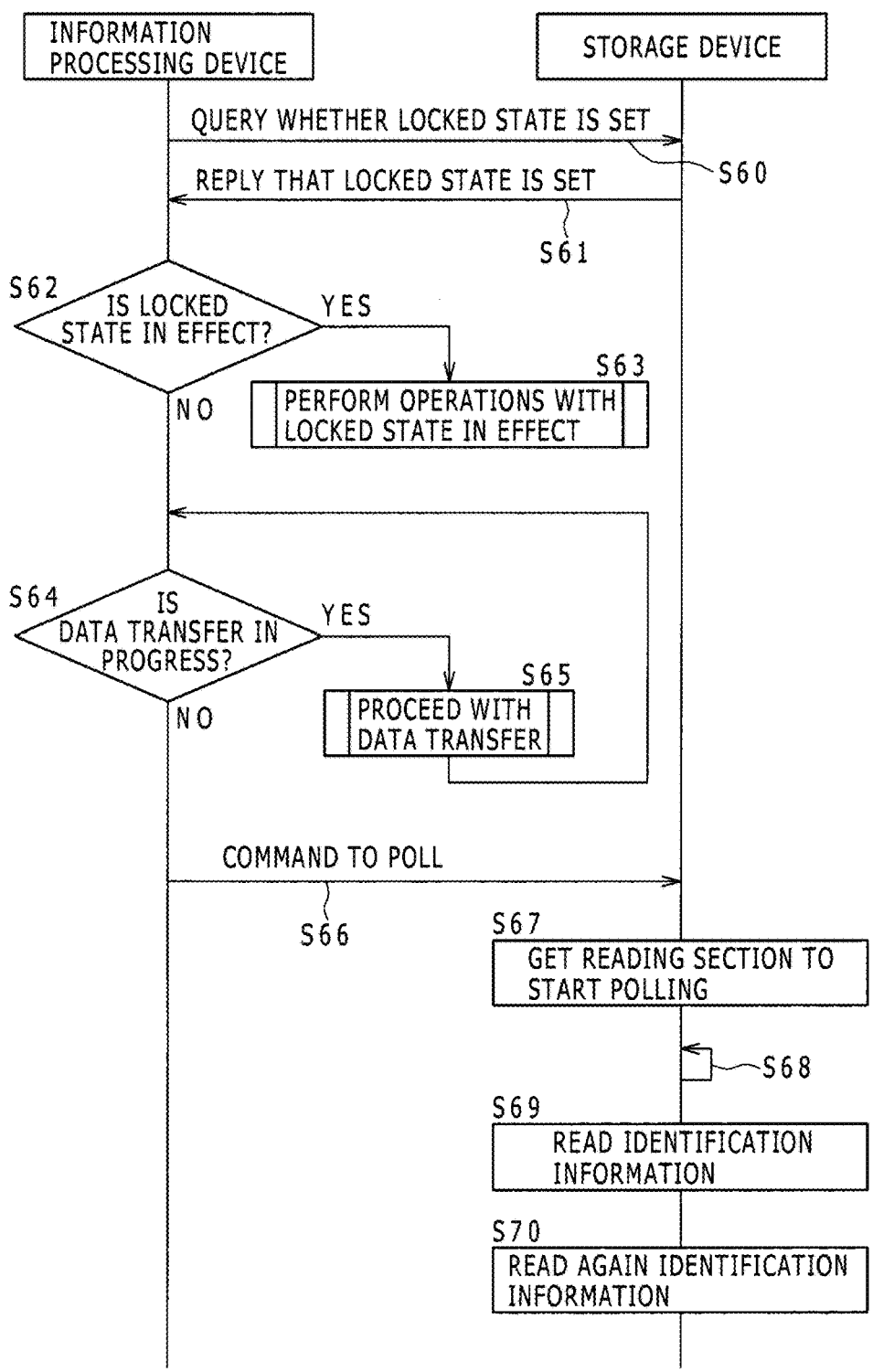
FIG. 9 is a sequence diagram showing typical operations by an information processing system according to another aspect of the present disclosure.
Figure 10:
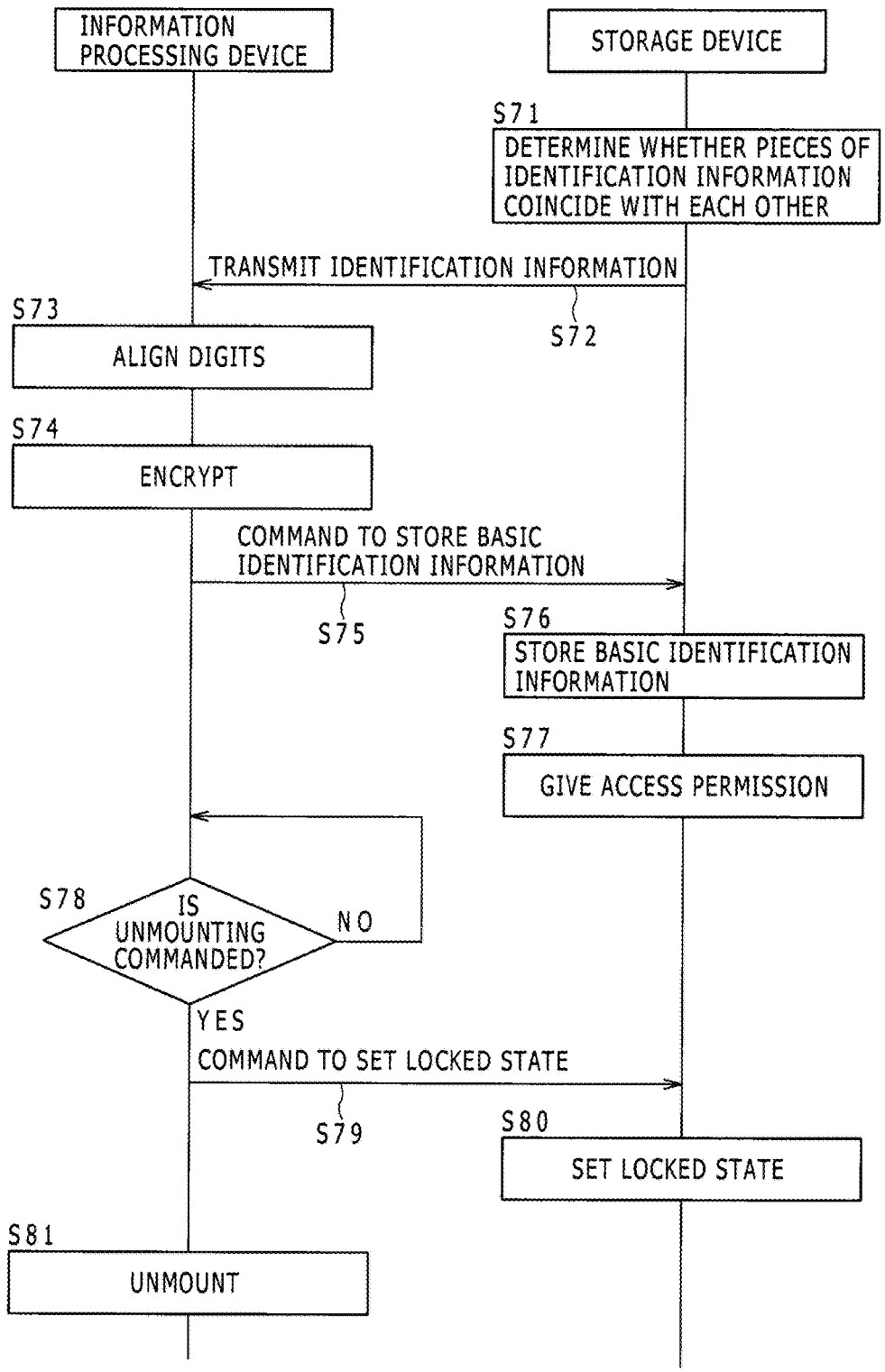
FIG. 10 is a sequence diagram showing other typical operations by the information processing system according to still another aspect the present disclosure.

FIGS. 9 and 10 are sequence diagrams for explaining the operations by an information processing system S according to another aspect of the present disclosure. The configuration of the information processing system S is substantially the same as that of the above-described information processing system S in one aspect of the present disclosure, so that the same components are designated by the same reference numerals and their explanations are omitted for simplification herein.

The operations in steps S60 through S62 are substantially the same as those in steps S30 through S32 and thus will not be discussed further. In step S62, however, if the storage device 2 is in the locked state ("Yes" in step S62), the program moves to step S63; if the storage device 2 is in the unlocked state ("No" in step S62), the program moves to step S64. In step S63, the operations when the storage device 2 is in the locked state are performed as shown in FIGS. 7 and 8.

In step S64, the control section 50 of the information processing device 1 determines whether data is being transferred between the information processing device 1 and the storage device 2. If it is determined that data transfer is in progress ("Yes" in step S64), the program moves to step S65. If it is determined that data is not being transferred ("No" in step S64), the program moves to step S66. In step S65, the data transfer continues, after which the program returns to step S64.

The operations in steps S66 through S81 are substantially the same as those in steps S5 through S20 and thus will not be discussed further.

The user may thus bring the IC card 4 near the reading section 42 of the storage device 2 at any time to have the identification information 4a read from the IC card 4, setting the storage device 2 in the locked state next time the storage device 2 is connected to the information processing device 1.

In the foregoing examples, authentication for access to the storage device 2 is performed through cooperation between the control section 50 of the information processing device 1 and the control section 40 of the storage device 2. Alternatively, the storage device 2 alone may authenticate access to itself.

Figure 11:
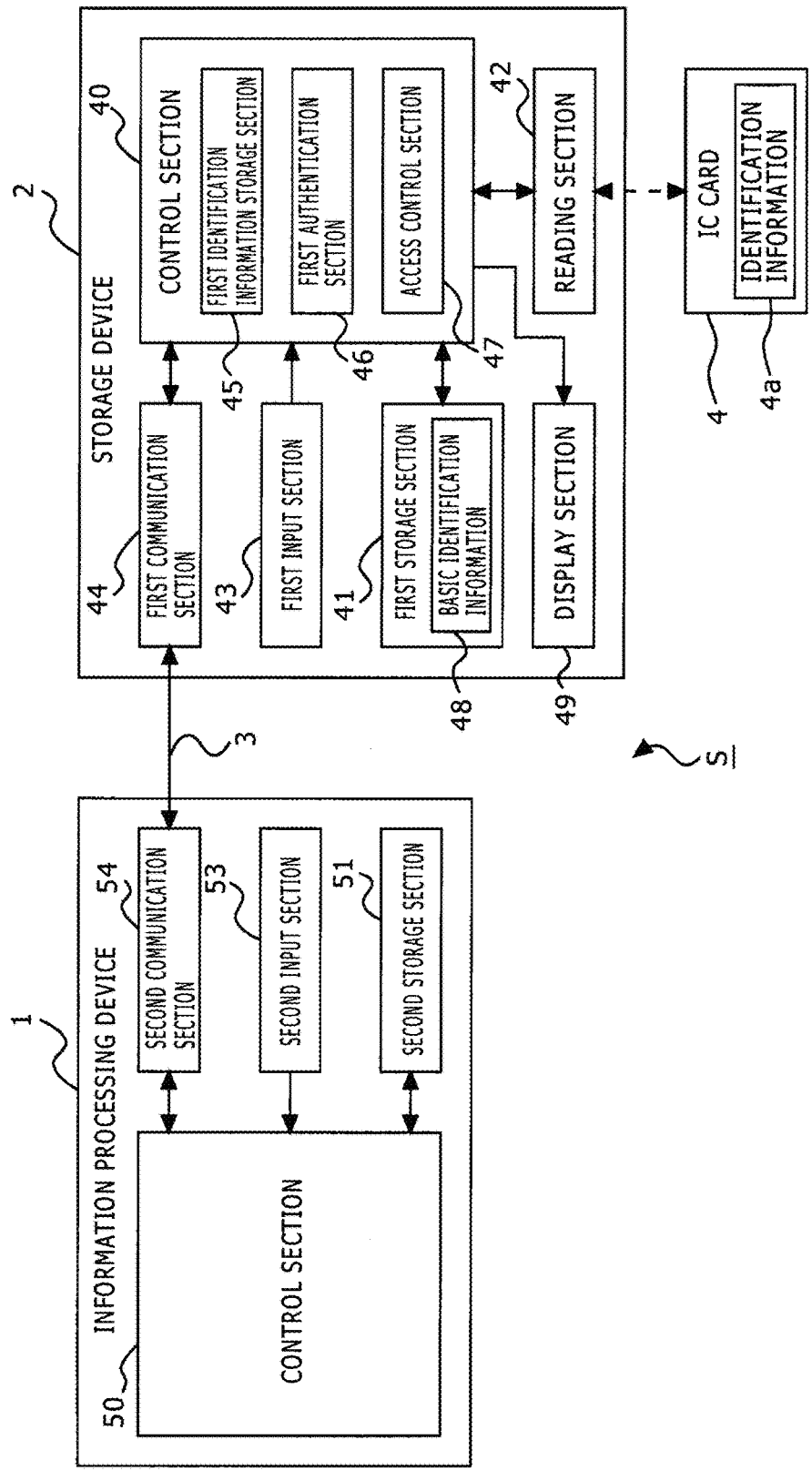
FIG. 11 is a functional block diagram showing a functional structure of an information processing system according to still another aspect of the present disclosure.

FIG. 11 is a functional block diagram showing a functional structure of an information processing system S according to still another aspect of the present disclosure. In FIG. 11, the control section 50 of the information processing device 1 does not have the display section 52, second identification information storage section 55, and second authentication section 56 which are provided in the foregoing embodiments. Instead, the storage device 2 has a display section 49. Except these arrangements, the configuration of the information processing system S is substantially the same as that of the above-described information processing system S in the above-described other aspects of the present disclosure, so that the same components are designated by the same reference numerals and their explanations are omitted for simplification herein.

The embodiment described in the preceding paragraphs still provides the same benefits as the foregoing embodiments.

As explained above using examples, providing multiple areas (drives) in the first storage section 41 so that the access control section 47 appropriately switches a drive recognizable by the information processing device 1 is also embraced within the scope of the access control section 47 setting whether to permit access in accordance with the present disclosure. Whereas the basic identification information 48 stored in the first storage section 41 corresponds to the identification information 4a stored on a single IC card 4 in the foregoing embodiments, this is not limitative of the present disclosure. Alternatively, multiple pieces of the basic identification information 48 corresponding to multiple pieces of the identification information 4 stored on multiple IC cards 4 may be stored in the specific area of the first storage section 41. As another alternative, the access control section 47 may select different accessible areas in the first storage section 41 in keeping with multiple pieces of the identification information 4a stored on multiple IC cards 4.

Figure 12:
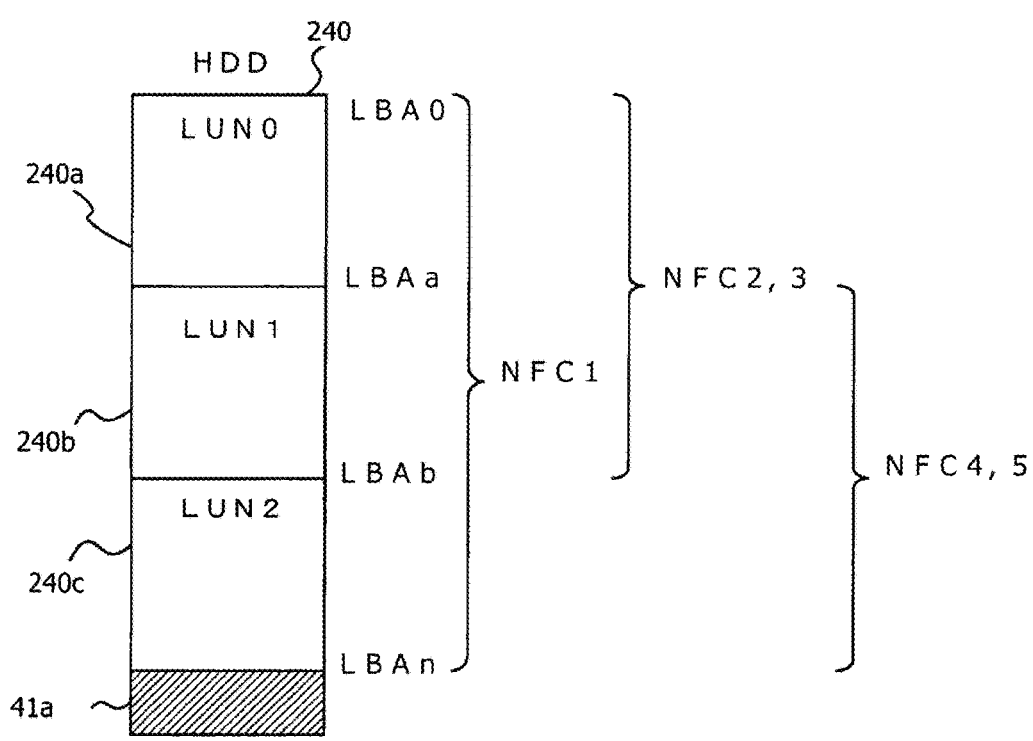
FIG. 12 is a schematic view conceptually illustrating areas in a storage device making up part of an information processing system according to yet still another aspect of the present disclosure.

FIG. 12 is a schematic view conceptually illustrating areas in a storage device 3 making up part of an information processing system S according to still another aspect of the present disclosure. In this embodiment, a HDD 200 constituting the first storage section 41 of the storage device 3 is zoned to multiple areas (three areas in the example of FIGS. 12; 240a, 240b, and 240c). The overall configuration and the functional structure of the information processing system S are substantially the same as those of the foregoing embodiments, so that the same components are designated by the same reference numerals and their explanations are omitted for simplification herein.

The storage device 3 in this embodiment has three logical unit numbers (LUNs) 0 through 2 assigned to a single HDD 240. The controller 20 and the control section 40 recognize the individual LUN 0 through LUN 2 representative of multiple drives (or areas; three in this embodiment).

Under the LBA scheme, LUN 0 is defined by LBA 0 to LBAa-1, LUN 1 by LBAa to LBAb-1, and LUN 2 by LBAb to LBAn (a, b, care all integers, where $0 \leq a \leq b \leq n$ is established). Preferably, $a=n*\frac{1}{3}$ and $b=n*\frac{2}{3}$. In this case, LUN 0 through LUN 2 all have the same area size.

Besides the areas managed as LUN 0 through LUN 2, the hindmost LBA on the HDD 240 has a specific area 41a in which the basic identification information 48 is stored. More specifically, in the specific area 41a on the HDD 240, multiple pieces (five in this embodiment) of the basic identification information 48 corresponding to the identification information 4a stored on multiple (five in this embodiment) IC cards 4 have been stored in the first identification information storage section 45. This specific area 41a, not managed by the LUN, is not recognized by the information processing device 1 (i.e., hidden area).

The first authentication section 46 performs authentication using the identification information 4a read by the reading section 42 and the basic identification information 48 stored in the specific area 41a. More specifically, after the reading section 42 has read the identification information 4a in the IC card 4, the first authentication section 46 performs authentication successively using the multiple pieces of the basic identification information 48 stored in the specific area 41a of the first storage section 41. If any of the multiple pieces of the basic identification information 48 in the specific area 41a is determined to coincide with the identification information 4a, the first authentication section 46 determines that authentication is successful.

If the authentication by the first authentication section 46 is successful, the access control section 47 permits access to a designated one of the zoned areas (LUN 0 to LUN 2) in the first storage section 41.

The operation of the access control section 47 will now be explained below in more detail. In this embodiment, an area (drive) of the first storage section 41 is determined beforehand to access the identification information 4a on each of the five IC cards 4. In accordance with the identification information 4a read by the reading section 42, the access control section 47 permits access to the corresponding accessible area in the first storage section 41.

As shown in FIG. 12, a user who owns a particular IC card 4 (shown as NFC 1 in FIG. 12) is an administrator. Given the identification information 4a stored on this IC card 4 (NFC 1), the access control section 47 allows this user to access all areas (LUN 0 to LUN 2) in the first storage section 41.

Another user (called the user A) who owns other two IC cards 4 (NFC 2 and NFC 3 in FIG. 12) has the right to access only some of the drives. Given the identification information stored on this IC card 4 (NFC 1), the access control section 47 allows the user A to access two (LUN 0 and LUN 1) of the areas in the first storage section 41.

Still another user (called the user B) who owns other two IC cards 4 (NFC 4 and NFC 5 in FIG. 12) has the right to access only some other drives. Given the identification information stored on this IC card 4 (NFC 1), the access control section 47 allows the user B to access two (LUN 1 and LUN 2) of the areas in the first storage section 41.

The area LUN 1 is accessible by all users. Furthermore, the access control section 47 may permit access to the area LUN 1 without the first authentication section 46 performing authentication beforehand.

This embodiment thus provides the same benefits as the foregoing embodiments.

An additional benefit is that the access control section 47 can suitably set the accessible areas for each user because it controls access after determining which areas are accessible by the users (administrator, user A, and user B) who own the IC card 4.

It should be noted that the number of pieces of the basic identification information 48 stored in the specific area 41a and the number of pieces of the identification information 4a (i.e., number of IC cards 4) are not limited to those cited in the foregoing example. Whereas the specific area 41a was shown to be set aside at the hindmost LBA, the specific area 41 may be established in any area on the HDD 240 provided it is not managed under the LUN.

The details of the above-described information processing system S and others available in the present disclosure are not limited to those of the foregoing embodiments. The present disclosure may be implemented in many other ways.

For example, although the basic identification information 48 is stored primarily in the HDD section 24 constituting the first storage section 41, the basic identification information 48 may alternatively be stored first into the flash memory 25 and then into the HDD section 24 as a backup after a predetermined time period.

In the foregoing examples, the access control section 47 permits access to the first storage section 41 that is the storage medium. Alternatively, the access control section 47 may individually control the right to record (write) data to the storage medium and the right to retrieve (read) data from the storage medium. For example, suppose that the reading section 42 reads the identification information 4a from a particular IC card 4 and that the first authentication section 46 performs authentication using the retrieved identification information 4a and the basic identification information 48. In this case, the access control section 47 may grant either/both the right to record data to, or/and the right to retrieve data from, the first storage section 41. Furthermore, if multiple areas are provided in the first storage section 41 as in the foregoing embodiments, the access control section 47 may grant either/both the right to record data to, or/and the right to retrieve data from, each of the areas (LUN 0 to LUN 2) zoned in accordance with the identification information 4a.

In the foregoing embodiments, the programs for operating the information processing device 1 and the storage device 2 are stored in the ROM 11 or 31, for example. Alternatively, a digital versatile disc (DVD), other storage devices, a USB external storage device, or a memory card storing the programs may be connected to those operating devices via an optical disk drive (not shown). The programs may then be read from the connected storage medium into the operating devices to operate the programs. As another example, the programs may be stored on a server in the Internet 5 and read from there into the operating devices to operate the programs. Furthermore, in the foregoing embodiments, the information processing device 1 and the storage device 2 are each made up of multiple hardware components. Alternatively, the operation of some of these hardware components may be achieved by the CPU 10 and the controller 20 running the programs.

[Newly Added]

The information processing system and other disclosures in this application possess the following technical features.

Preferably, the storage device may further include an identification information storage section configured such that if the basic identification information is determined not to be stored in the specific area of the storage medium, the identification information storage section may store the identification information read by the reading section into the specific area of the storage medium as the basic identification information.

Preferably, the storage device may further include an access control section configured to permit access to the storage medium when authentication by the authentication section is successful. Also, preferably the storage device may further include an access control section configured to permit access to the storage medium if the basic identification information is not stored in the specific area of the storage medium, the access control section further permitting access to the storage medium when, with the basic identification information stored in the specific area of the storage medium, the authentication by the authentication section is successful.

Preferably, the identification information storage section may append additional information to the identification information read by the reading section to generate the basic identification information having a fixed data length, the identification information storage section further storing the generated basic identification information into the specific area of the storage medium. Also, the identification information storage section may preferably append type information indicative of the type of the IC card to the identification information read by the reading section to generate the basic identification information, the identification information storage section further storing the generated basic identification information into the specific area of the storage medium. Furthermore, the identification information storage section may preferably cause the reading section to perform a plurality of operations to read the identification information and, when the identification information read by the reading operations is the same at least a predetermined number of times, store the same identification information into the specific area of the storage medium as the basic identification information.

Preferably, the specific area may not be recognizable by an information processing device connected to the storage device.

Preferably, if the storage device further includes an input section configured to output an operation input signal based on an operation input by a user, at least either the identification information storage section or the authentication section may receive the identification information read by the reading section only when the operation input signal is being output.

Preferably, when authentication by the authentication section is successful, the access control section may grant at least either a right to write data to or a right to read data from the storage medium.

Preferably, the specific area may store a plurality of pieces of the basic identification information corresponding to a plurality of pieces of the identification information on a plurality of the IC cards. In this case, the authentication section may preferably perform authentication by determining whether the identification information read by the reading section matches any one of the pieces of the basic identification information stored in the specific area.

Preferably, where the storage medium is zoned to a plurality of areas, the specific area may store a plurality of pieces of the basic identification information corresponding to a plurality of pieces of the identification information on the IC cards. Based on the identification information read by the reading section, the access control section may permit access to a designated one of the zoned areas on the storage medium. Furthermore, based on the identification information read by the reading section, the access control section may preferably grant at least either the right to write data to or the right to read data from the designated one of the zoned areas on the storage medium.

According to another aspect of the present disclosure, there is provided an information processing system including a storage device and an information processing device connectable to the storage device. The storage device includes: a storage medium; a reading section configured to read identification information stored on an IC card; and an identification information storage section configured to output basic identification information stored in a specific area of the storage medium to the information processing device. The information processing device includes: an authentication section configured to perform authentication using the identification information read by the reading section and the basic identification information output from the identification information storage section; and an access control section configured to permit access to the storage medium when authentication by the authentication section is successful.

According to a further aspect of the present disclosure, there is provided an authentication method for a storage device having a storage medium and a reading section. The method includes: causing the reading section to read identification information stored on an IC card; and performing authentication using the identification information read by the reading section and basic identification information stored in a specific area of the storage medium.

According to an even further aspect of the present disclosure, there is provided a program for causing a computer having a storage medium to function as a device including: a reading section configured to read identification information stored on an IC card; and an authentication section configured to perform authentication using the identification information read by the reading section and basic identification information stored in a specific area of the storage medium.

The present disclosure therefore provides a storage device, an information processing system, an authentication method for a storage device, and a program whereby an IC card is used for authentication of access to the storage device such as the HDD having a storage medium.

It should be understood by those skilled in the art that various modifications, combinations, sub-combinations and alterations may occur depending on design requirements and other factors in so far as they are within the scope of the appended claims or the equivalents thereof.

What is claimed is:

1. A storage device, comprising:
    a storage medium; and
    circuitry configured to:
    perform a read operation to read identification information stored on an integrated circuit (IC) card;
    perform, in a case that basic identification information is stored in a specific area of the storage medium, authentication using the identification information read by the circuitry and the basic identification information stored in the specific area of the storage medium;
    in a case that the basic identification information is not stored in the specific area of the storage medium:
    perform a plurality of read operations to read the IC card, and
    store, in a case that the identification information is read at least a predetermined number of times during the plurality of read operations, the identification information into the specific area of the storage medium as the basic identification information;
    append additional information to the identification information read by the circuitry to generate the basic identification information having a fixed data length; and store the generated basic identification information having the fixed data length into the specific area of the storage medium.

2. The storage device according to claim 1, wherein the circuitry is configured to permit access to the storage medium in a case that the authentication by the circuitry is successful.

3. The storage device according to claim 1, wherein the circuitry is configured to:
    permit access to the storage medium in the case that the basic identification information is not stored in the specific area of the storage medium; and permit access to the storage medium in a case that, with the basic identification information stored in the specific area of the storage medium, the authentication by the circuitry is successful.

4. The storage device according to claim 1, wherein the circuitry is configured to:
append type information indicative of a type of the IC card to the identification information read by the circuitry to generate the basic identification information; and
store the generated basic identification information into the specific area of the storage medium.

5. The storage device according to claim 1, wherein the specific area is not recognizable by an information processing device connected to the storage device.

6. The storage device according to claim 1, wherein the circuitry is configured to:
output an input operation signal based on an input operation by a user; and
receive the identification information read by the circuitry only in a case that the input operation signal is being output.

7. The storage device according to claim 2, wherein the circuitry is configured to, in the case that the authentication by the circuitry is successful, grant at least either a right to write data to or a right to read data from the storage medium.

8. The storage device according to claim 1, wherein the specific area stores a plurality of pieces of the basic identification information corresponding to a plurality of pieces of the identification information on a plurality of IC cards.

9. The storage device according to claim 8, wherein the circuitry is configured to perform the authentication by determining whether the identification information read by the circuitry matches any one of the plurality of pieces of the basic identification information stored in the specific area.

10. The storage device according to claim 2, wherein the storage medium is zoned to a plurality of areas;
the specific area stores a plurality of pieces of the basic identification information corresponding to a plurality of pieces of the identification information on a plurality of IC cards; and
based on the identification information read by the circuitry, the circuitry is configured to permit access to a designated one of the plurality of zoned areas on the storage medium.

11. The storage device according to claim 10, wherein, based on the identification information read by the circuitry, the circuitry is configured to grant at least either a right to write data to or a right to read data from the designated one of the plurality of zoned areas on the storage medium.

12. The storage device according to claim 1, wherein, the storage medium is a hard disk drive.

13. The storage device according to claim 1, wherein, the basic identification information is encrypted.

14. The storage device according to claim 1, wherein, the circuitry is configured to set a state in which the storage medium is not allowed to be accessed based on a command transmitted from an information processing device.

15. An information processing system, comprising:
a storage device; and
an information processing device connectable to the storage device, wherein
the storage device includes a storage medium and first circuitry that is configured to:
perform a read operation to read identification information stored on an (IC) card; and
output, in a case that basic identification information is stored in a specific area of the storage medium, the basic identification information stored in the specific area of the storage medium to the information processing device,
the information processing device includes second circuitry configured to:
perform, in a case that basic identification information is stored in a specific area of the storage medium, authentication using the identification information read by the first circuitry and the basic identification information output from the first circuitry; and
permit access to the storage medium in a case that the authentication by the second circuitry is successful, and
the first circuitry is further configured to:
in a case that the basic identification information is not stored in the specific area of the storage medium, to:
perform a plurality of read operations to read the IC card, and
store, in a case that the identification information is read at least a predetermined number of times during the plurality of read operations, the identification information into the specific area of the storage medium as the basic identification information;
append additional information to the identification information read by the first circuitry to generate the basic identification information having a fixed data length; and
store the generated basic identification information having the fixed data length into the specific area of the storage medium.

16. An authentication method, comprising:
performing a read operation, using circuitry of a storage device, to read identification information stored on an integrated circuit (IC) card;
performing authentication, in a case that basic identification information is stored in a specific area of a storage medium, using the identification information read by the circuitry and the basic identification information stored in the specific area of the storage medium;
in a case that the basic identification information is not stored in the specific area of the storage medium:
performing a plurality of read operations to read the IC card, and
storing, in a case that the identification information is read at least a predetermined number of times during the plurality of read operations, the identification information into the specific area of the storage medium as the basic identification information;
appending additional information to the identification information read by the circuitry to generate the basic identification information having a fixed data length; and storing the generated basic identification information having the fixed data length into the specific area of the storage medium.

17. A non-transitory computer readable medium including executable instructions, which when executed by a computer cause the computer to execute an authentication method, the method comprising:
performing a read operation to read identification information stored on an integrated circuit (IC) card;
performing authentication, in a case that basic identification information is stored in a specific area of a storage medium, using the identification information and the basic identification information stored in the specific area of the storage medium;

in a case that the basic identification information is not stored in the specific area of the storage medium:

performing a plurality of read operations to read the IC card, and storing, in a case that the identification information is read at least a predetermined number of times during the plurality of read operations, the identification information into the specific area of the storage medium as the basic identification information;

appending additional information to the identification information that is read to generate the basic identification information having a fixed data length; and storing the generated basic identification information having the fixed data length into the specific area of the storage medium.

* * * * *